United States Patent
Lin et al.

(10) Patent No.: US 7,714,465 B2
(45) Date of Patent: May 11, 2010

(54) ANTI-DEFORMATION MECHANISM FOR AN AXIAL ROD MOTOR

(75) Inventors: Chien-Cheng Lin, Taichung (TW); Fang-Yue Wang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 92 days.

(21) Appl. No.: 12/190,513

(22) Filed: Aug. 12, 2008

(65) Prior Publication Data

US 2010/0038977 A1 Feb. 18, 2010

(51) Int. Cl.
*H02K 41/03* (2006.01)
(52) U.S. Cl. .................. 310/12.27; 310/12.31
(58) Field of Classification Search ............. 310/21.01, 310/21.27, 12–14
See application file for complete search history.

(56) References Cited

U.S. PATENT DOCUMENTS 6,323,568 B1 * 11/2001 Zabar ......................... 310/17
6,734,583 B2 * 5/2004 Fujisawa et al. ......... 310/12.27
2004/0263001 A1 * 12/2004 Yamanaka ................... 310/12

FOREIGN PATENT DOCUMENTS

JP         2007185054 A   *   7/2007

* cited by examiner

*Primary Examiner*—Quyen Leung
*Assistant Examiner*—Leda Pham
(74) *Attorney, Agent, or Firm*—Banger Shia

(57) ABSTRACT

An anti-deformation mechanism for an axial rod motor comprising a base, two vertical fixing seats, two axial fixing seats, two axial screws, a stator and a mover arranged on the stator. The two vertical fixing seats are arranged on the base to support the stator vertically. The two axial fixing seats are arranged on the base and located outside the two vertical fixing seats. Each of the two axial fixing seats is provided with a fixing through hole for insertion of the axial screw. The stator is an elongated cylindrical rod and provided with an axial screw hole at each of two ends thereof to be screwed with the axial screws. Both ends of the stator are fixed by the vertical fixing seats and the axial screws, and synchronously, the two axial screws apply pull forces to the stator to prevent the bending deformation of the stator.

5 Claims, 8 Drawing Sheets

ANTI-DEFORMATION MECHANISM FOR AN AXIAL ROD MOTOR

BACKGROUND OF THE INVENTION

1. Field of the Invention

The present invention relates to a positioning device usually used on laser boring machine, small milling machine, image detecting instruments, etc, and more particularly to an anti-deformation mechanism for an axial rod motor.

2. Description of the Prior Art

Currently, a conventional axial rod motor essentially comprises, as shown in FIGS. 6 and 7, a base 80, two vertical fixing seats 81, a stator and a mover 83. The two vertical fixing seats 81 are disposed on two opposite ends of the base 80, and each of the vertical fixing seats 81 is provided with an elastic combining hole 811 having an axial opening at the top thereof, and each combining hole 811 is provided with a screw hole 812 to be screwed with a screw 813. The stator 82 is an elongated cylindrical rod, and both ends of the stator 82 are inserted through the elastic combining holes 811 of the two vertical fixing seats 81 in such a manner that the stator 82 is suspended. After the screw 813 is screwed in the screw hole 812, both ends of the stator 82 can be locked by the elastic combining holes 811. The mover 83 is arranged on a portion of the stator 82 between the two vertical fixing seats 81. The mover 83 is provided for placement of devices and controlling the movement of the devices.

The mover 83 drives the devices to move along the stator 82 in such a way that the stator 82 serve as a principal supporting member besides a rail. The stator 82 generally has a great length and made of a material with toughness and flexibility, and only two ends of the stator 82 are supported by the vertical fixing seats 81, so that the stator 82 will bend after a long time of bearing a load, as shown in FIG. 8, the farther the load is from the two vertical fixing seats 81, the more obvious the bending deformation of the stator 82 will be, thus affecting the movement precision of the mover 83 and consequentially increasing the error of the measurement and finished products.

The present invention has arisen to mitigate and/or obviate the afore-described disadvantages.

SUMMARY OF THE INVENTION

The primary objective of the present invention is to provide an anti-deformation mechanism for an axial rod motor, which can reduce the bending deformation of the stator and straighten the bent stator, so as to make the mover move stably.

In order to achieve the above objective, the anti-deformation mechanism for an axial rod motor comprises a base, two vertical fixing seats, two axial fixing seats, two axial screws, a stator and a mover. The two vertical fixing seats are oppositely arranged on the base for supporting the stator vertically, and the two axial fixing seats are also oppositely arranged on the base and respectively located outside the two vertical fixing seats. The respective vertical fixing seats are provided with a through positioning hole to be matched with the axial screws. The stator is an elongated cylindrical rod and provided with an axial screw hole in each of two opposite ends to be screwed with the axial screws. Both ends of the stator are fixed by the vertical fixing seats and subjected to the pull forces of the axial screws. The mover is arranged on a portion of the stator between the two vertical fixing seats.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
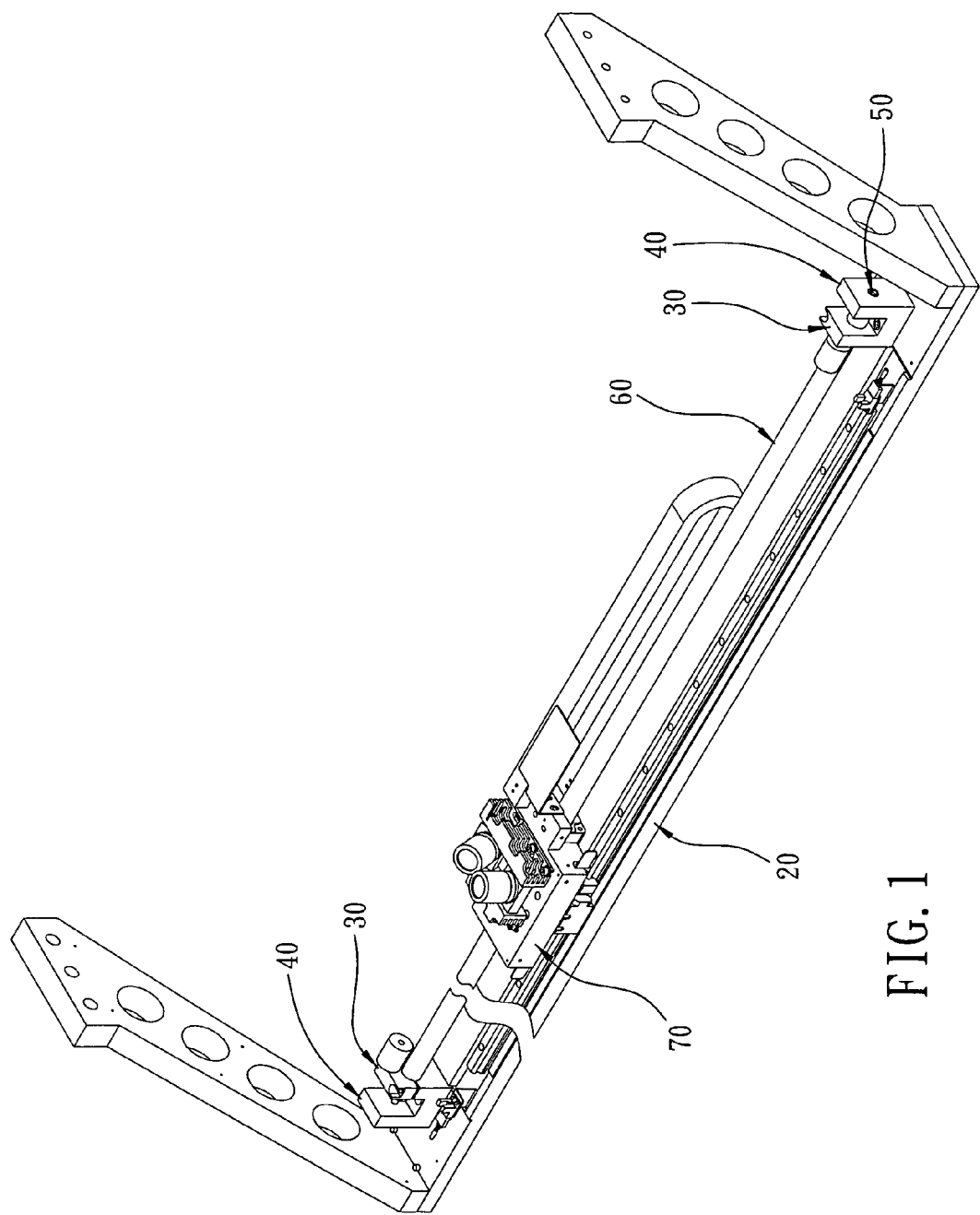
FIG. 1 is a perspective view of an anti-deformation mechanism for an axial rod motor in accordance with the present invention.
Figure 2:
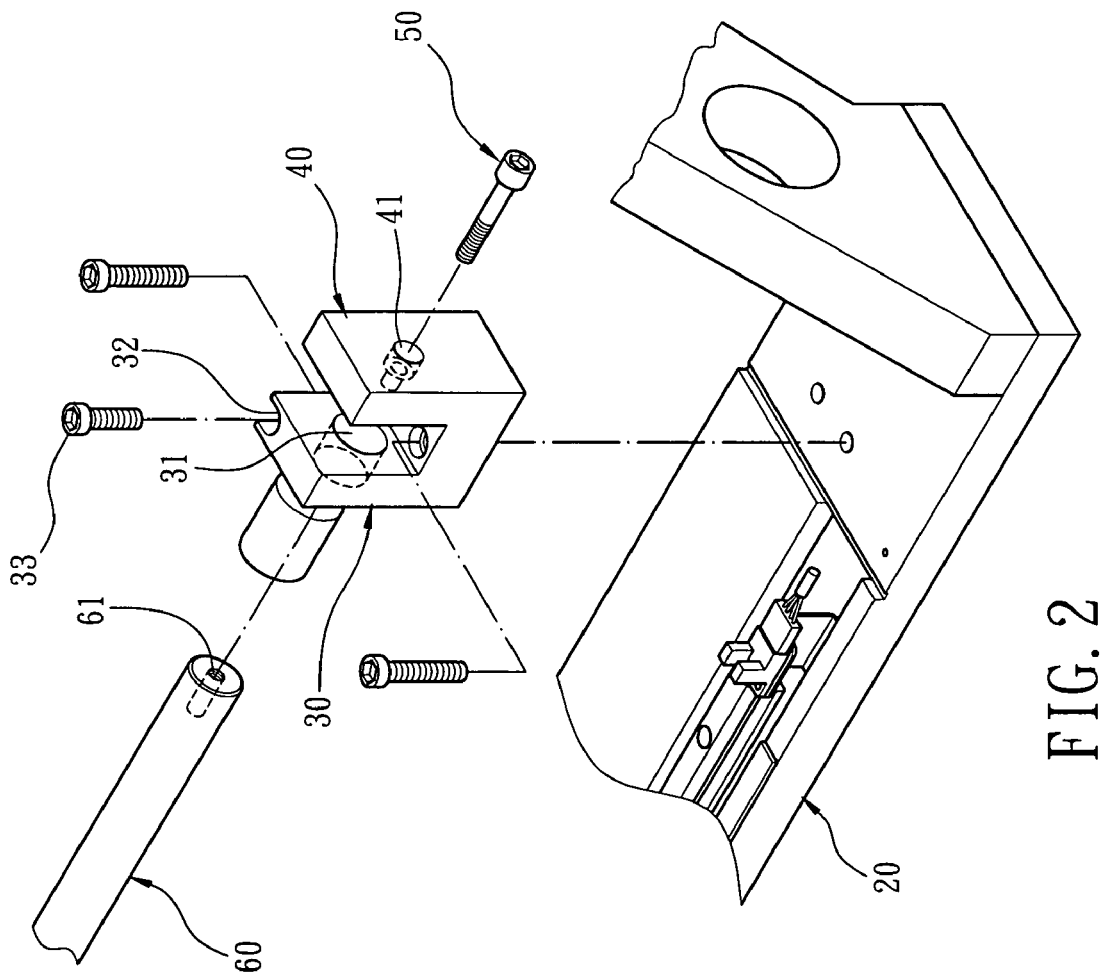
FIG. 2 is a partial exploded view of the anti-deformation mechanism for an axial rod motor in accordance with the present invention.
Figure 3:
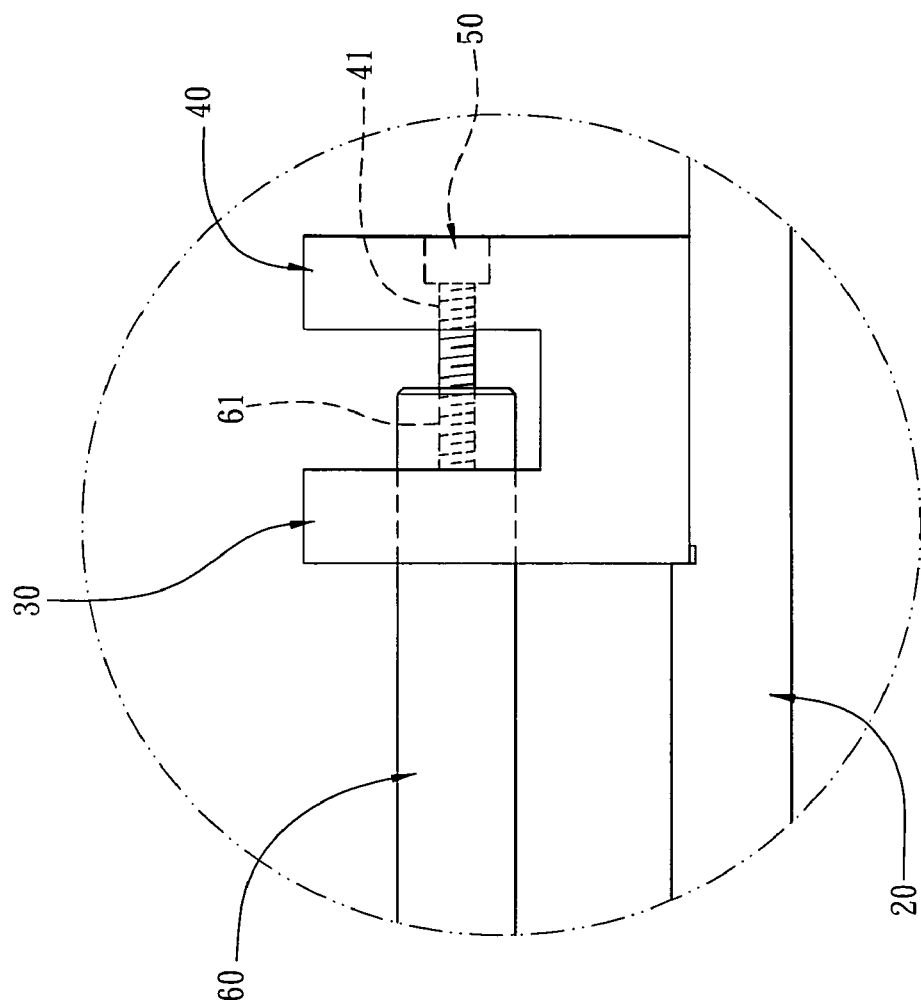
FIG. 3 is a partially amplified view of the anti-deformation mechanism for an axial rod motor in accordance with the present invention.

Referring to FIGS. 1-3, an anti-deformation mechanism for an axial rod motor in accordance with a preferred embodiment of the present invention comprises a base 20, two vertical fixing seats 30, two axial fixing seats 40, two axial screws 50, a stator 60 and a mover 70.

The two vertical fixing seats 30 are oppositely arranged on the base 20, and each of the two vertical fixing seats 30 is provided with an elastic combining hole 31 with an axial opening (as shown in FIG. 2). At the opening of the elastic combining hole 31 is provided a screw connection hole 32 cooperating with a locking screw 33.

The two axial fixing seats 40 are also oppositely arranged on the base 20 and located outside the two vertical fixing seats 30. Each of the axial fixing seats 40 is provided with a through positioning hole 41 in the form of a countersink, and the through positioning holes 41 are coaxial with the elastic combining holes 31 of the vertical fixing seats 30.

The two axial screws 50 are respectively disposed into the two positioning holes 41 from outside to inside.

The stator 60 is an elongated cylindrical rod and provided with an axial screw hole 61 in each of two opposite ends thereof. The two ends of the stator 60 are inserted through the elastic combining holes 31 of the two vertical fixing seats 30 in such a manner that the middle portion of the stator 60 is suspended and the two ends of the stator 60 are vertically supported. After the locking screw 33 is screwed in the screw connection hole 32, both ends of the stator 60 are fixed by the elastic combining hole 31. The axial screws 50 are screwed in the two axial screw holes 61 in such a manner that the two axial screws 50 can axially pull both ends of the stator 60.

The mover 70 is disposed on a portion of the stator 60 between the two vertical fixing seats 30. The mover 70 is provided for placement of a device to control and drive the movement of the device.

The respective vertical fixing seats 30 can be integrated with the respective axial fixing seats 40 to form a U-shaped structure, the bottom of which is locked on the base 20. Alternatively, the respective vertical fixing seats 30 and the respective axial fixing seats 40 can be separate elements.

Figure 4:
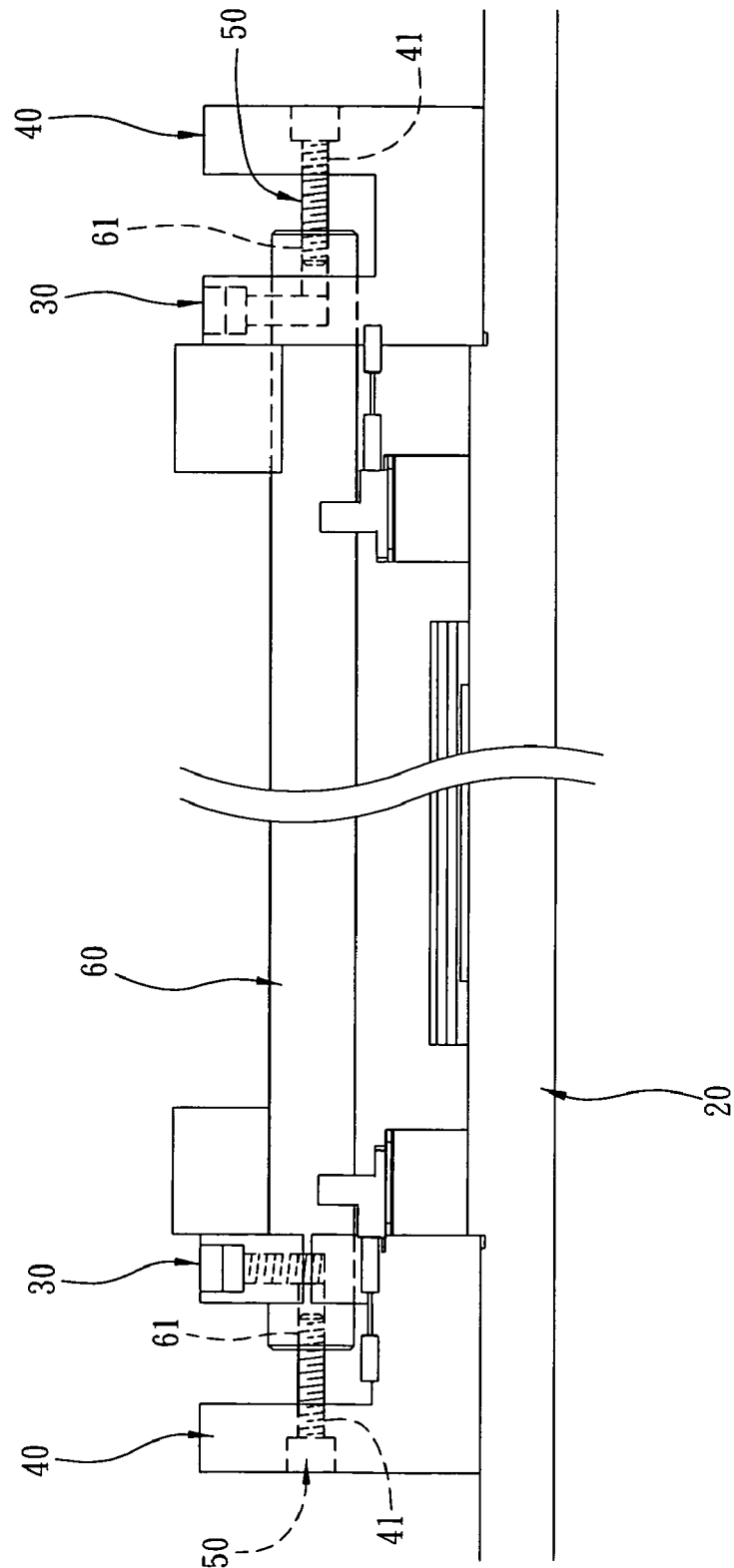
FIG. 4 illustrates that the stator is not pre-pulled by anti-deformation mechanism for an axial rod motor in accordance with the present invention.
Figure 5:
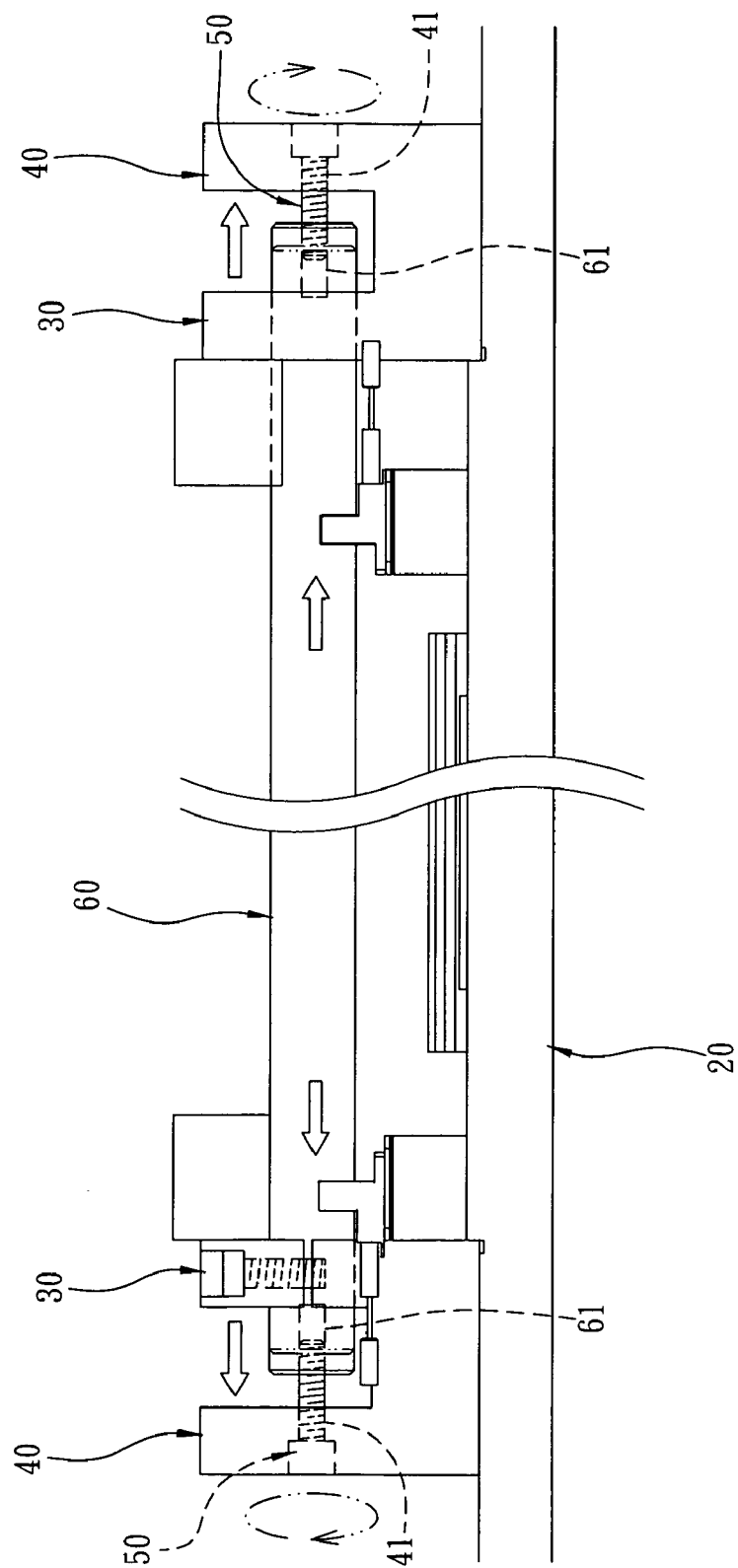
FIG. 5 illustrates that the stator has been pre-pulled by the anti-deformation mechanism for an axial rod motor in accordance with the present invention.
Figure 6:
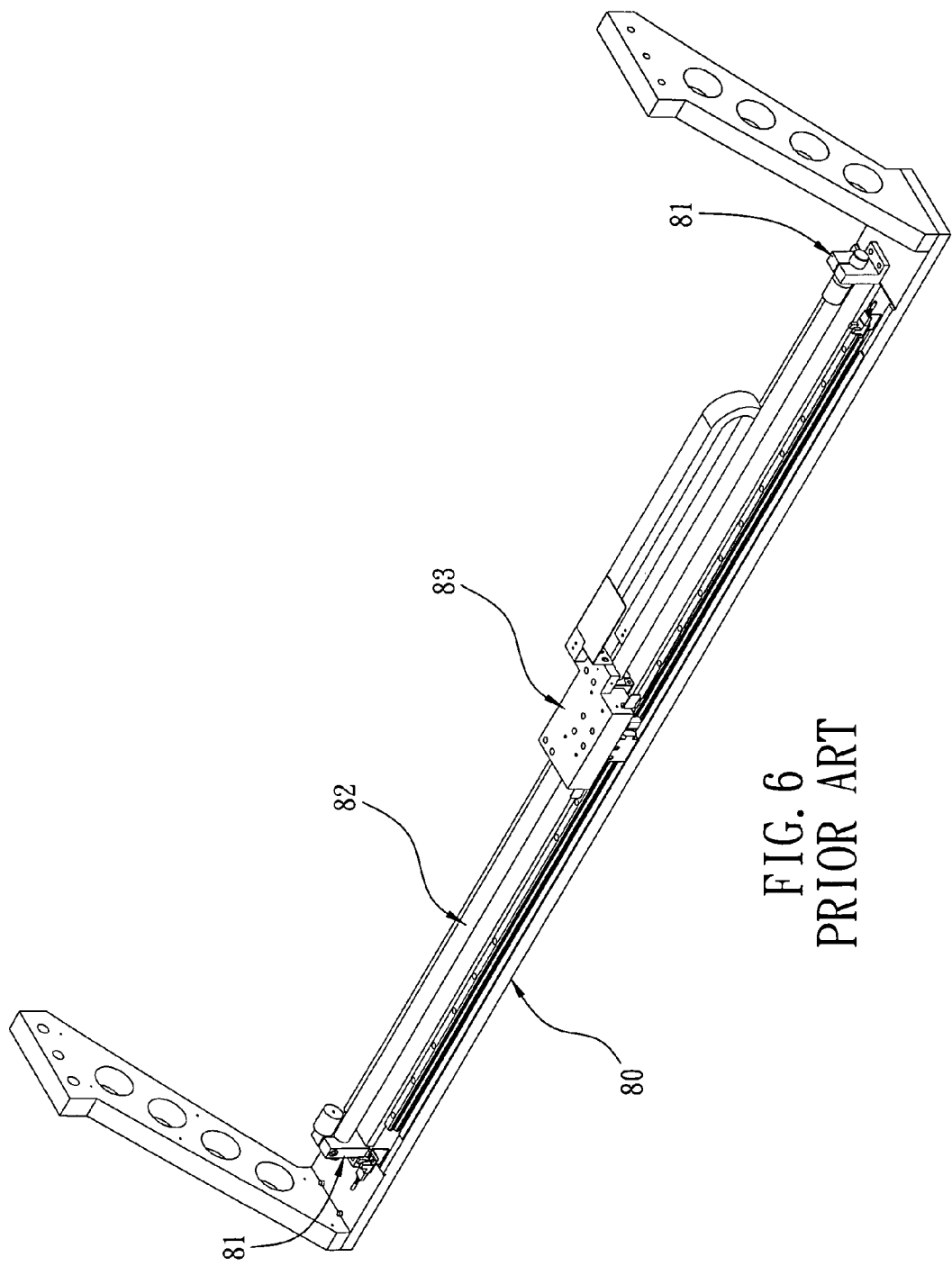
FIG. 6 is a perspective view of a conventional axial rod motor.
Figure 7:
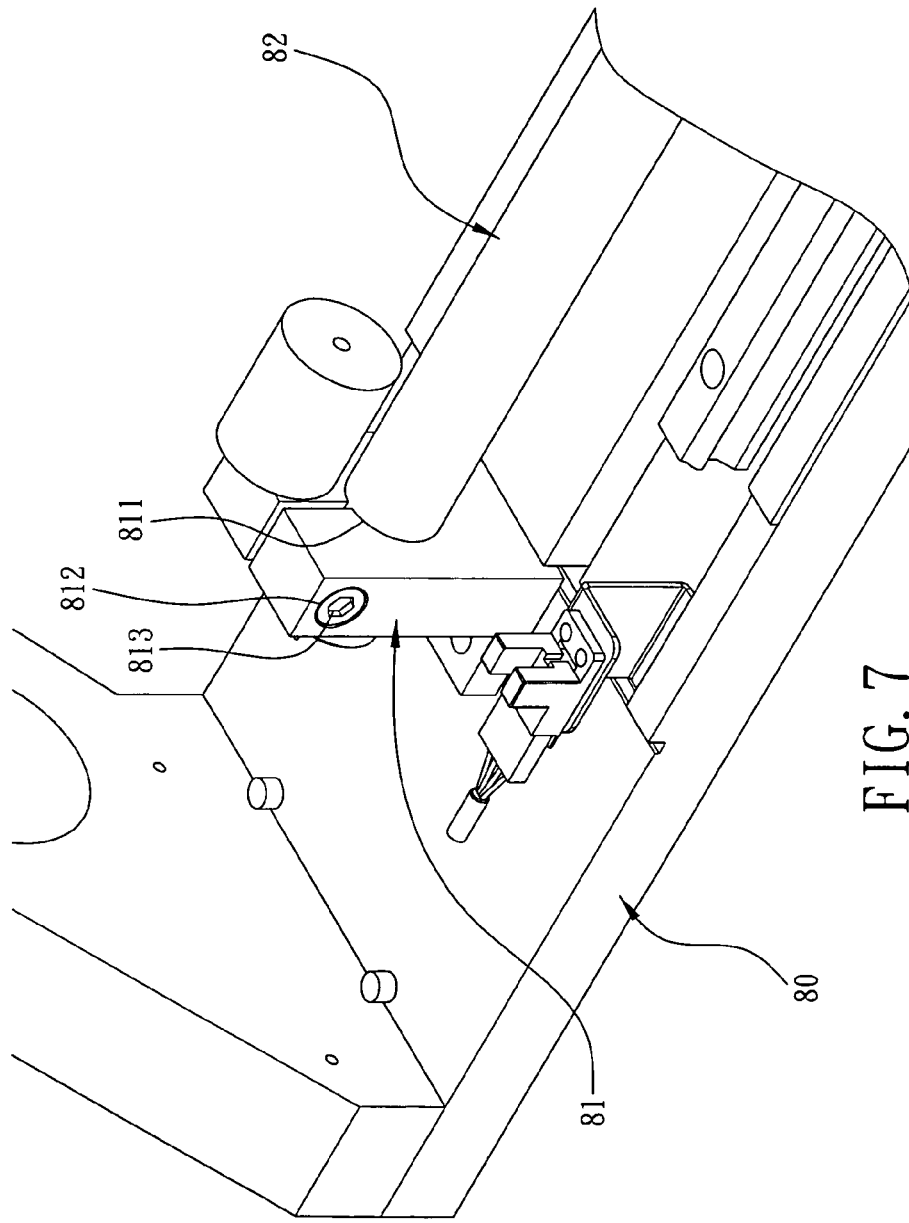
FIG. 7 is a partial enlarged view of the conventional axial rod motor.
Figure 8:
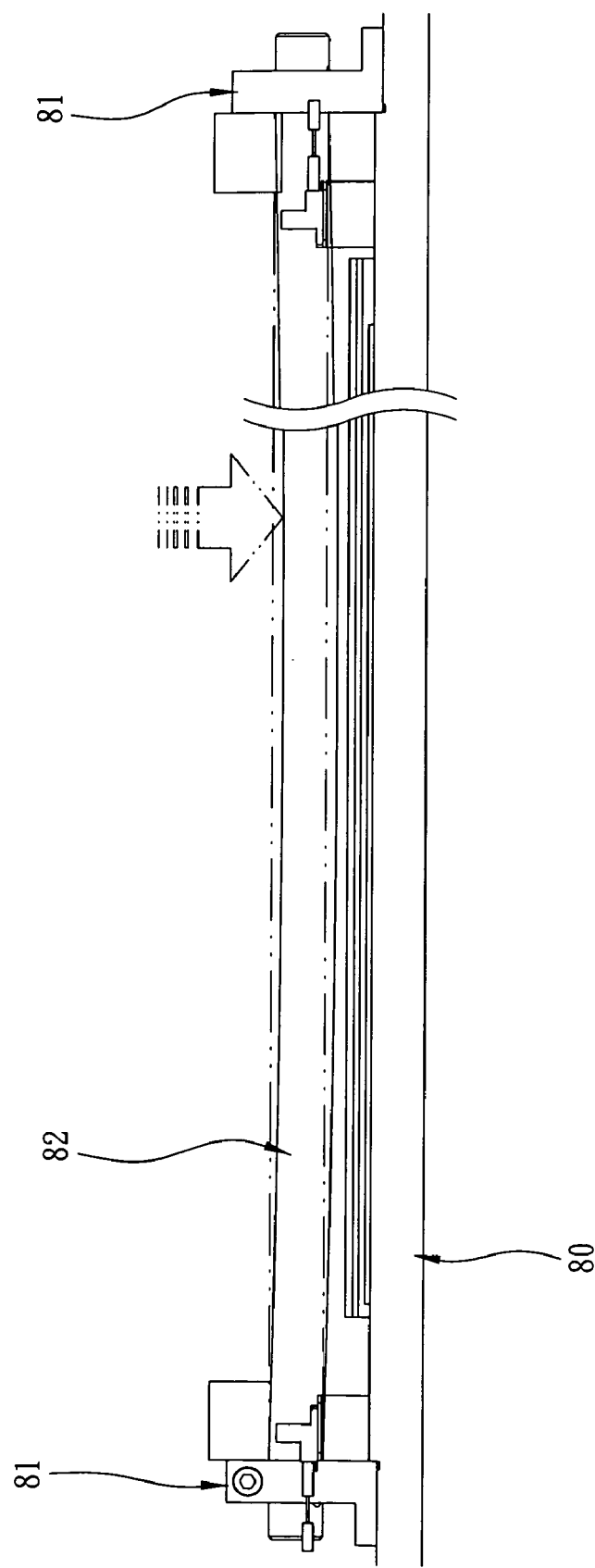
FIG. 8 illustrates the bending deformation of the conventional axial rod motor.

Further referring to FIG. 4, the two ends of the stator 60 are disposed in the elastic combining holes 31 of the two vertical fixing seats 30 in such a manner that the stator 60 can be vertically suspended. The two vertical fixing seats 30 can only make the middle portion of the stator 60 suspend, but can not share any load on the stator 60. However, the stator 60 is mostly made of rolled steel which inherently has toughness and flexibility, so the stator 60 will bend after bearing the load for a long time, and the farther from the two vertical fixing seats 30, the more obvious the bending deformation will be. As shown in FIG. 5, the two axial screws 50 are screwed in the two ends of the stator 60 while being supported by the two axial fixing seats 40, and rotating the two axial screws 50 can pull the stator 60 axially to offer an axial pre-pull force to stator 60, so as to prevent the bending deformation of the stator 60, thus improving the straightness of the stator 60.

As known from the above specific embodiment, the present invention has the following advantages: besides that the stator 60 is supported by the two vertical fixing seats 30, the stator 60 is additionally coaxially provided with two axial fixing seats 40, each of which cooperates with a locking screw 33, and rotating the locking screws 33 can adjust the pre-pull force applied to the two ends of the stator 60, so as to straighten the stator 60 axially, thus reducing the bending deformation; even though bending deformation occurs on the stator 60, the stator 60 can be straightened by the pre-pull force, thus making the mover 70 move stably.

What is claimed is:

1. An anti-deformation mechanism for an axial rod motor, comprising:
   a base;
   two vertical fixing seats being oppositely arranged on the base, each of the two vertical fixing seats being provided with an elastic combining hole with an axial opening, at the opening of the elastic combining hole being provided a screw connection hole cooperating with a locking screw;
   at least one axial fixing seat being arranged on the base and located outside the vertical fixing seats, the axial fixing seat being provided with a through positioning hole, which is coaxial with the elastic combining holes;
   at least one axial screw cooperating with the axial seat and being arranged in the positioning hole;
   a stator being an elongated cylindrical rod and provided with an axial screw hole in one end thereof for cooperating with axial fixing seat, two ends of the stator being inserted through the elastic combining hole of the two vertical fixing seats in such a manner that a middle portion of the stator is suspended, and the two ends of the stator are supported, after the locking screw being screwed in the screw connection hole, both ends of the stator being fixed by the elastic combining hole, the axial screw being screwed in the axial screw in such a manner that the axial screw applies an axial pull force to the stator; and
   a mover being arranged on a portion of the stator between the two vertical fixing seats and moving back and forth along the stator.

2. The anti-deformation mechanism for an axial rod motor as claimed in claim 1, wherein the positioning hole in the axial fixing seat is in the form of a countersink.

3. The anti-deformation mechanism for an axial rod motor as claimed in claim 1, wherein the vertical fixing seats and the axial fixing seat, that are located at the same side of the base, are integral with each other as a U-shaped structure.

4. The anti-deformation mechanism for an axial rod motor as claimed in claim 1, wherein the vertical fixing seats and the axial fixing seat are separate elements.

5. The anti-deformation mechanism for an axial rod motor as claimed in claim 1 further comprising two axial fixing seats and two axial screws, the two axial fixing seats being respectively arranged outside the two vertical fixing seats on the base, the two axial screws being arranged in the two positioning holes, the stator being provided with an axial hole at each of two ends thereof for screwing with the two axial screws.

* * * * *